Patented July 8, 1941

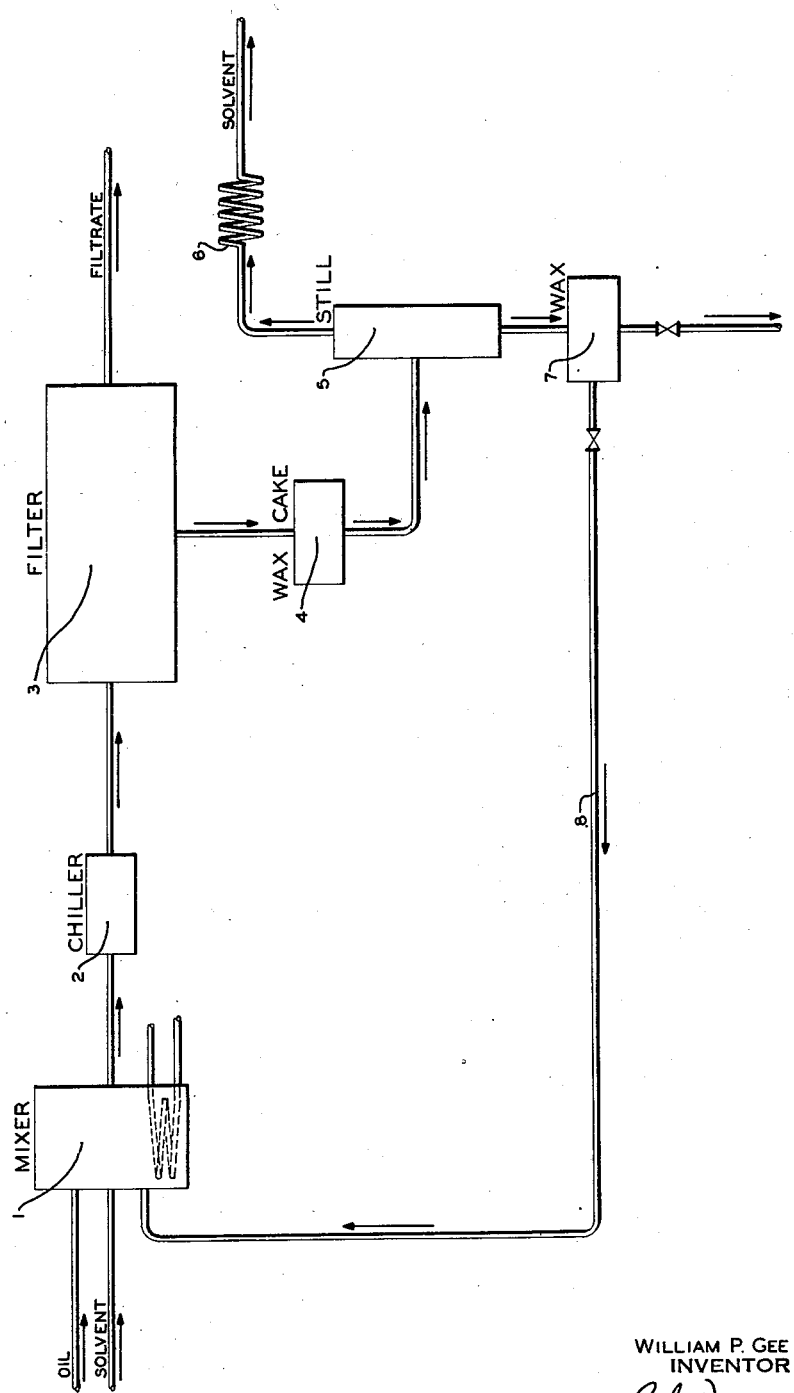

2,248,668

UNITED STATES PATENT OFFICE 2,248,668

DEWAXING HYDROCARBON OIL

William P. Gee, Plainfield, N. J., assignor to The Texas Company, New York, N. Y., a corporation of Delaware Application February 11, 1939, Serial No. 255,834

4 Claims. (Cl. 196—18)

This invention relates to dewaxing hydrocarbon oil, such as mineral lubricating oil. It relates particularly to dewaxing mineral lubricating oil containing relatively small amounts of wax or from which the wax is precipitated in a relatively dense form.

It contemplates a method of dewaxing such oil by continuous filtration, advantageously with a continuous rotary type of filter, wherein the concentration of wax in the wax-bearing mixture being filtered is increased substantially so as to improve very substantially the filter production rate.

The concentration of wax in the mixture being filtered is advantageously increased by incorporating therein a substantial proportion of the wax removed as a filter cake. Sufficient wax is recycled or incorporated in the mixture so as to increase substantially the ratio of wax to oil, thereby increasing the rate of filter cake formation. The decrease in time required for cake formation permits a higher speed of filter operation with a consequent increase in the filter rate.

It has been known in the prior art to incorporate waxy material in wax-bearing mixtures to be dewaxed. For example, U. S. Patent No. 1,881,643, granted to Leo D. Jones October 11, 1932, describes the addition of petrolatum or amorphous wax to wax-bearing oil prior to centrifuging, while U. S. Patent No. 2,053,872, granted to Samuel A. Montgomery September 8, 1936, describes the addition of a small amount of heavy distillate or wax cake from such heavy distillate to light distillate lubricating oil stock prior to dewaxing with conventional filter presses. But these patentees employ the added material for the purpose of conditioning the wax or modifying its structure so that it will precipitate in a different form.

The present invention differs from the practices described in the foregoing patents in that it relates to the addition of wax to the wax-bearing oil charge in a continuous filtration operation involving stages of wax cake formation, washing, drying and wax cake discharge. The addition of wax to the charge enables the control of wax cake thickness so as to permit effective washing, drying and cake removal, thereby securing the maximum filtration capacity with no sacrifice in yield of low pour test oil.

The invention is especially useful in the dewaxing of residual cylinder stocks which tend to form relatively dense and compact filter cakes. Heretofore difficulty has frequently been experienced in dewaxing such stocks by continuous rotary filters due to the excessive length of time required to deposit a wax cake of sufficient thickness to be discharged from the filter cloth. It is desirable to have a wax cake of not less than about ¼" in thickness in order to be discharged properly from the filter surface. A thinner cake may result in a smearing action by the wax cake scraper, which tends to plug the filter cloth and to decrease the flow of fluids therethrough.

With wax-bearing oil stocks which tend to form relatively dense and compact wax cakes and stocks which contain small amounts of wax, the cycle time for continuous filters necessary to deposit a wax cake of desired thickness may be so great as to reduce seriously the production rate of the filter and cause the operation to become unattractive commercially. For example, it may require as much as 700 seconds or more of filtering time to form a wax cake of about ¼" thickness, as contrasted with about 15–60 seconds of filtering time normally required to produce the same thickness of wax cake.

According to the present invention, the production rate in the case of stocks of the above character can be increased very greatly by artificially increasing the concentration of wax in the mixture being dewaxed. With increased wax concentration the time required for forming a filter cake of desired thickness is reduced. The resulting cake can be washed more effectively and can be discharged effectively, due to its increased thickness and weight. At the same time the filter production rate is very substantially increased, while obtaining a uniformly high yield of dewaxed oil.

As a specific illustration of the invention, a wax-bearing cylinder stock fraction, for example, of about 150 Saybolt Universal seconds viscosity at 210° F., and containing around 8% wax, is mixed with a selective dewaxing solvent. Such a solvent comprises a mixture of about 40% methyl ethyl ketone and 60% commercial benzol. About one volume of the cylinder stock is mixed with around three or four volumes of the solvent mixture. To this mixture is added around 4 to 15% of wax by volume of the wax-bearing oil feed. The mixture is advantageously heated to around 160° F. in order to effect substantially complete solution of all the wax and oil in the solvent liquid. Thereafter, the heated mixture is chilled to around −10° F. and filtered by means of a rotary filter to produce dewaxed filtrate and a filter cake comprising wax, solvent and a small amount of oil.

The solvent is removed from the filtrate, leaving a dewaxed oil having a pour test corresponding substantially to the temperature at which the mixture was filtered. The filter cake is drawn off to a wax tank. A portion of this wax, after removal of the solvent, is then recycled to the feed mixture, wherein it is incorporated as previously described.

It is, of course, contemplated that the solvent need not be stripped from the recycled wax or may be only partially stripped. In such case the solvent retained in the wax returned forms a component of the dewaxing solvent to be mixed with the feed oil. The amount of solvent initially mixed with the feed may be adjusted to compensate for the amount added with the recycled wax.

According to one mode of procedure, the wax being recycled may be heated to a sufficiently high temperature to dissolve the wax in the retained solvent. If desired, a quantity of solvent may be added to the wax prior to such heating. The resulting solution of wax in solvent is then added to the initial mixture of feed oil and solvent. Further heating may be unnecessary and the resulting mixture is thereafter subjected to chilling, as previously described.

The following data illustrate the advantage to be gained by incorporating in a cylinder stock, having the characteristics described above, wax to the extent of about 4.4% by volume of cylinder stock. In each case the cylinder stock was mixed with a selective solvent, such as mentioned above, chilled and filtered to produce a yield, based on the original oil, of about 94% dewaxed oil having a pour test of around 0° F.:

| Added wax | Seconds required for cake formation | Minutes required for total cycle | Cake thickness | Filtration rate* |
|---|---|---|---|---|
| *Percent* | | | *Inches* | |
| 0.0 | 700 | 20 | 3/16 | 2.32 |
| 4.4 | 350 | 10 | 1/4 | 3.76 |

*Gallons of dewaxed oil per square foot of filter surface per hour of cycle time.

Thus, as indicated, operating a dewaxing filter of the rotary type in the conventional manner required 700 seconds to form a filter cake 3/16 inches in thickness. The total cycle time was 20 minutes and the filtration rate was only 2.32 gallons. On the other hand, by increasing the wax content by 4.4%, when running to a cake of 1/4" thickness, reduced the cake-forming time to 350 seconds, with a cycle time of only 10 minutes, while substantially increasing the filtration rate. Further increase of wax concentration will further increase the filter production rate.

By way of illustration, reference may be made to the drawing, which comprises a flow diagram for dewaxing in accordance with the method of the present invention.

The oil to be dewaxed, namely, a residual lubricating oil stock, together with a dewaxing solvent liquid, such as a mixture of an aromatic hydrocarbon and an aliphatic ketone, is introduced to a mixer 1. The oil and solvent are mixed in proportions such that at temperatures of around 0° F. and below the solvent has substantially complete solvent action on the liquid constituents of the oil and substantially no solvent action upon the solid hydrocarbon constituents of the oil.

The mixture of oil and solvent is passed through a chiller 2, wherein it is chilled to a temperature of around 0° F. and below to precipitate the wax. The chilled mixture containing precipitated wax is then passed to a rotary type filter 3, wherein the solid hydrocarbons are removed from the mixture in the form of a filter cake of wax. The filtrate obtained comprises dewaxed oil and is withdrawn, the solvent being removed therefrom and returned for further use.

The wax cake is collected in a tank 4 from which it is conducted to a still 5 wherein the solvent is removed. The solvent so removed is condensed in a coil 6.

The wax from which the solvent has been removed is drawn off from the still 5 to a tank 7, from which a suitable portion of the wax is recycled through a pipe 8 to the mixer 1. Complete solution of the recycled wax in the oil and solvent in the mixer 1 is advantageously accomplished by subjecting the mixture to heating, the mixer 1 being provided with a heating coil as indicated.

In referring to the dewaxing solvent, reference has been made to mixtures of aliphatic ketones and aromatic hydrocarbons. It is, of course, contemplated that other selective solvents may be employed, composed of a mixture of a wax antisolvent and oil solvent. Instead of selective solvent mixtures other types of dewaxing solvents may also be employed, such as low-boiling point petroleum hydrocarbons, including naphtha, gasoline, pentane, butane, propane, etc., or mixtures thereof.

Obviously, many modifications and variations of the invention, as hereinbefore set forth, may be made without departing from the spirit and scope thereof, and therefore only such limitations should be imposed as are indicated in the appended claims.

I claim:

1. In the continuous method of dewaxing wax-bearing oil, containing wax which precipitates in relatively dense form, by continuous filtration involving the forming, washing, drying and discharging of a wax cake in a recurring cycle, the method which comprises mixing the oil with a dewaxing solvent, chilling the mixture to precipitate wax, passing the chilled mixture to a continuous filter, filtering the wax from the mixture, and recycling to the mixture prior to filtering a portion of the wax removed, said wax being of substantially the same grade as that removed from the charge in the filtration, thereby to increase the ratio of wax to oil therein whereby a filter cake of wax permitting effective washing and discharge is obtained, and a high filter production rate is secured.

2. In the art of dewaxing oils in which wax is removed by means of a continuous rotary filter, the steps comprising mixing a dewaxing solvent with a wax-bearing oil, which mixture upon chilling and filtering tends to deposit a thin cake difficult to discharge from the filter, chilling the mixture to precipitate wax, passing the chilled mixture to a filter to remove the precipitated wax and to produce a dewaxed filtrate, and mixing a predetermined portion of the removed wax with the mixture prior to filtering, the wax so returned corresponding in melting point range to that of the wax removed from the charge in the filtration, and being returned in such amount as to materially increase the ratio of wax to oil over that of the original wax-bearing oil charge thereby to control the character and thickness of the cake whereby the same may be rapidly formed and removed from the filter while permitting a high filter production rate.

3. In the art of dewaxing oils in which wax is removed by means of a continuous rotary filter, the steps comprising mixing a dewaxing solvent with a wax-bearing oil, which mixture upon chilling and filtering tends to deposit a thin cake difficult to discharge from the filter, chilling the mixture to precipitate wax, passing the chilled mixture to a filter to remove the precipitated wax and to produce a dewaxed filtrate, and dissolving in the mixture, prior to chilling, a predetermined portion of the removed wax of substantially the same grade as that removed from the charge in the filtration in such amount as to materially increase the ratio of wax to oil over that of the original wax-bearing oil charge thereby to control the character and thickness of the cake whereby the same may be rapidly formed and removed from the filter while permitting a high filter production rate.

4. In the art of dewaxing oils in which wax is removed by means of a continuous rotary filter, the steps comprising mixing a dewaxing solvent with a wax-bearing oil, which mixture upon chilling and filtering tends to deposit a thin cake difficult to discharge from the filter, chilling the mixture to precipitate wax, passing the chilled mixture to a filter to remove the precipitated wax and to produce a dewaxed filtrate, and incorporating in the wax-bearing charge prior to filtering a predetermined quantity of wax of substantially the same grade as that removed from the charge in the filtration, the amount of wax so incorporated being sufficient to materially increase the ratio of wax to oil over that of the original wax-bearing charge thereby to control the character and thickness of the cake whereby the same may be rapidly formed and removed from the filter while permitting a high filter production rate.

WILLIAM P. GEE.